Figure 1:
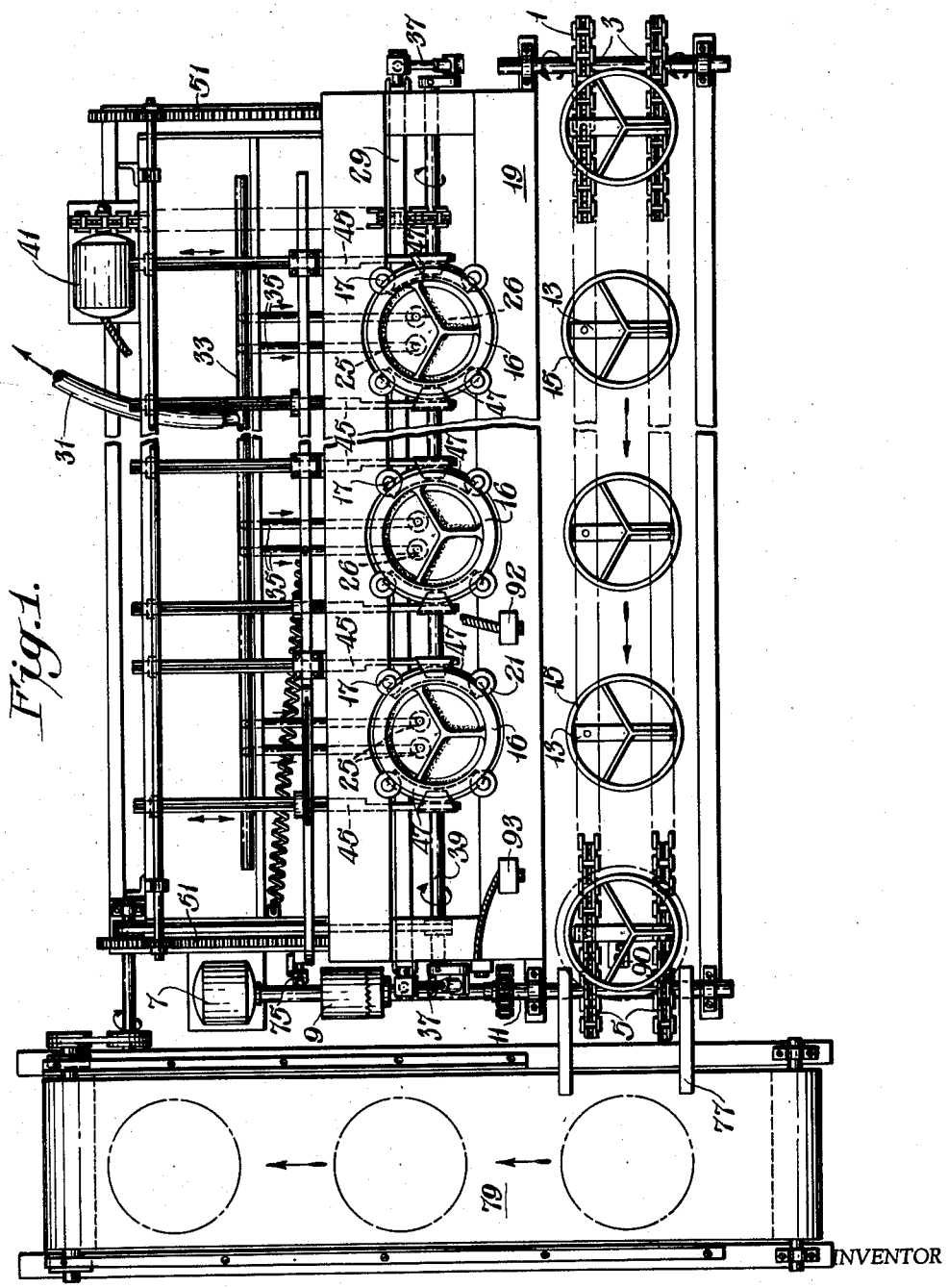

INVENTOR
ARTHUR J. POULIN
BY Connolly and Hutz
ATTORNEYS

Oct. 13, 1964

A. J. POULIN 3,152,700

APPARATUS AND METHOD FOR ASSEMBLING STACKS OF PARTITIONED PLATES

Filed Dec. 19, 1961

4 Sheets-Sheet 2

INVENTOR

ARTHUR J. POULIN

BY Connolly and Hutz

ATTORNEYS

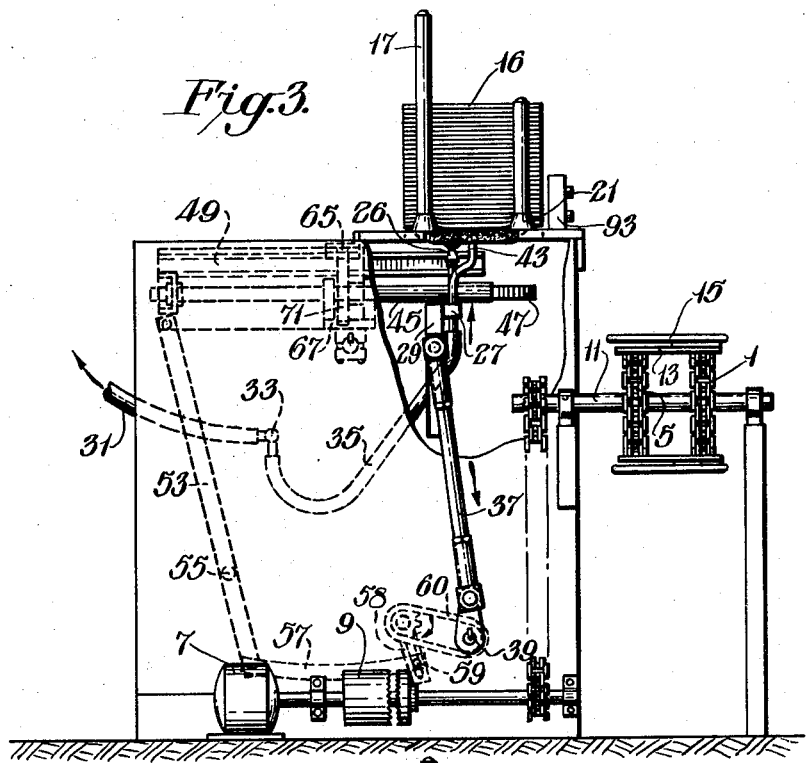
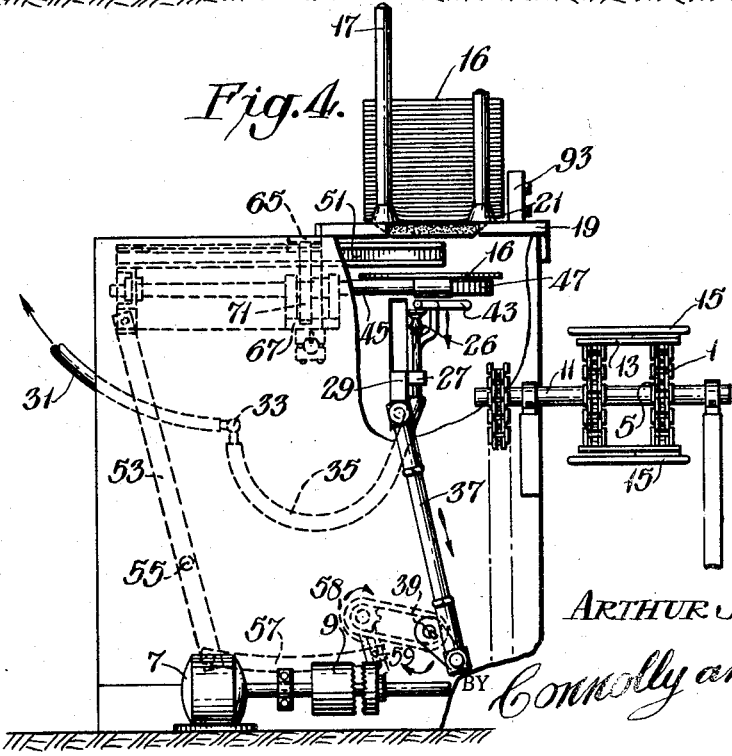

United States Patent Office 3,152,700
Patented Oct. 13, 1964

3,152,700
APPARATUS AND METHOD FOR ASSEMBLING
STACKS OF PARTITIONED PLATES
Arthur Joseph Poulin, Waterville, Maine, assignor to
Keyes Fibre Company, Portland, Maine, a corporation
of Maine
Filed Dec. 19, 1961, Ser. No. 160,503
10 Claims. (Cl. 214—6)

The present invention relates to an apparatus and method for assembling partitioned plates in a stack in which the plates are fully nested by virtue of the positive orientation of each plate with reference to the stack as the plate is positioned thereon. Additionally, the apparatus and method of the present invention can assemble a plurality of such stacks each containing a predetermined number of plates arranged in any preselected color combination.

Prior to the present invention there was no commercial apparatus capable of assembling partitioned plates formed of pulp or any other suitable material in a fully nested stack, i.e., manual intervention was necessary from time to time in order to correct faulty stacking of existing machines. The present invention is based on the discovery that the basic reasons for this difficulty of prior art machines are generally two-fold. First, the plates are usually allowed to slide freely on an inclined plane in traveling from a position beneath the supply stack of plates to a position at the top of a stack of plates which is being assembled. It is easily understood that during this sliding travel, the plates may rotate out of a previously oriented position and arrive at their destination with their partitioning channels on the bottom sides thereof out of alignment with the partitioning ridges on the upper side of plates already positioned at the top of the stack being assembled.

Secondly, even if the partitioned plates happened to slide without roating out of a previously oriented position, there is an orientation problem which is also found with respect to the supply stack of plates. This is brought about because of variations in the wall thickness in the ridge partitions of the plates which can cause successive plates in a stack to be slightly rotated with respect to one another. The accumulative effect of this is that the uppermost plates in a supply stack are usually oriented several degrees out of phase with those at the bottom of the supply stack. Thus, if the bottom plates of the supply stack are placed in proper orientation with respect to the stack to be assembled, the upper plates of the supply stack may be out of orientation with respect to the stack to be assembled.

It is, therefore, a primary object of this invention to provide a new and novel apparatus and method for overcoming the above problems associated with present day machines.

Other objects and advantages of this invention will become more apparent from a study of the following description and drawings wherein:

FIGURE 1 is a top view of the plate supply stacking apparatus;

FGURE 2 is a front view of the apparatus of FIGURE 1;

FIGURES 3–6 are end views showing the progressive steps of the operation for the apparatus; and FIGURE 7 is a top view of a detail of the apparatus showing the means for orienting and removing a plate from the supply stack of plates.

First, the invention will be briefly described. A plurality of spaced-apart and longitudinally arranged supply stacks of plates are supported above suitable plate openings through which the plates are withdrawn from the bottom of the stack. An endless conveyor belt which has fixed thereupon, at spaced-apart intervals in longitudinal arrangement, plate receiving supports, travels along, below, and to one side of the supply stacks of plates. The belt advances in intermittent manner with each plate receiving support receiving at least one plate from each supply stack of plates as the belt is intermittently advanced. During each pass of the belt, a plurality of relatively smaller stacks of plates are built up. These are then deposited upon a receiving belt.

Each plate is removed from the supply stacks by suction devices which reciprocate vertically, moving upward to grip the lowermost plate from the supply stack and then moving downwardly to remove the plate from the stack.

Reciprocating with the suction device, and at a level slightly above the same, is a plate centering or orientation device which moves into the partition grooves on the underside of the lowermost plate and slightly raises the supply stack to aid in bringing about a slight rotation of the plates at the bottom of the stack to a true orientated position should the grooves be slightly out of alignment with the orientation device. The supply stack of nested plates are generally not truly orientated from top to bottom with respect to their partitions as explained above but they are initially arranged and supported so that the partition grooves of the plates at the bottom thereof are in substantial alignment with the centering means.

After the suction devices draw a plate downwardly from the supply stack through the plate openings and while orientation of the plate is maintained by the orienting device, each plate passes between a pair of plate holding arms which receive the plate by contact with the plate periphery as suction is released by the suction devices and the orienting device moves out of contact with the plate grooves. These arms are then extended outwardly to a position over the endless conveyor belt while maintaining the orientation of the plate and are so manipulated in timed relation with the belt that they drop the plate, during an interruption period in the advance of the belt, directly upon one of the plate receiving supports of the endless belt or upon other plates already deposited on these supports. The conveyor may then be advanced to the next station and the above steps are repeated whereby the small assembled stack obtains one or more plates from each supply stack in fully nested relationship.

Assuming each supply stack contains partitioned plates of the same color and the colors of the various supply stacks differ from each other, the present invention permits assembly of individual small stacks, each of whose plates may be of one predetermined color or of a plurality of predetermined and arranged color combinations.

As seen better in FIGURES 1 and 2, an endless chain conveyor 1 is supported upon end sprocket assemblies 3 and 5, the sprockets being driven by drive motor 7 through clutch assembly 9 and shaft 11. Supported upon the chain conveyor 1 by cross-bars 13 are plate receiving skeletons 15 consisting of a ring section and a three-pronged web or rib center portion wherein the angular relationship of the prongs corresponds to that of the grooves in the underside of the plates. The conveyor is advanced in intermittent and timed manner whereby the plate receivers 15 on the conveyor stop at each or predetermined plate receiving stations to receive one or more plates. The intermittent advancing feature will be described in greater detail hereinafter.

To hold the supply stacks of plates 16 in place, vertically extending rods 17 are affixed to a main support 19. Each stack of plates 16 is retained in position by four rods 17. The plate stacks 16 are supported in spaced-apart relationship along, above, and to one side of the conveyor 1 as shown in FIGURES 1 and 2. As seen better in FIGURE 2, the lower ends of support bars 17 form flared ends 21 whereby the portions of the plates 16 contacting the flared ends 21 are forced slightly upwardly from their normal position to slightly wedge the plates in retained position between the rods, thus preventing them from slipping down below and between the bars 17 through suitable openings formed in the main support 19.

As seen in FIGURES 1 and 7, a pair of suction tubes 25 with suction cups 26, preferably of rubber, are supported in upright position immediately below each stack of supply plates 16. They are supported in blocks 27 permanently affixed to a vertically reciprocating elongated bar 29. A vacuum is provided to the tubes 25 by the main tube 31, the distributing pipe 33, and flexible suction lines 35 which are affixed to the suction tubes 25.

As mentioned above, the suction devices 26 serve to remove the bottom plates from the supply plate stacks through the openings in support 19 to a position below the supply stack. To accomplish this purpose, the elongated bar 29 is slidably supported at each end and, by crank assemblies 37, is vertically reciprocated through the motion imparted by drive shaft 39 driven by main drive motor 41. The cycle of the suction cups or devices 26 includes movement from the position shown in FIGURE 2 upwardly to contact and grip the underside of the lowermost plate in the supply stack as shown in FIGURE 3 and return to its position shown in FIGURE 2.

To make certain that the plates will be withdrawn from the supply stack with the partition grooves of each plate oriented in alignment with the web of plate receiving skeleton 15, a centering or orientation tool 43 is provided as shown in greater detail in FIGURE 7. The tool 43 is also supported in block 27 secured to the elongated bar 29 whereby it rises and descends simultaneously with the suction tubes 25. As seen there, the centering tool 43 consists of a three-pronged unit with the prongs extending radially, and the angular relationship of the prongs corresponding to the angular relationship of the partition grooves formed in the underside of the plates whereby when the tool is raised to its uppermost position it will fit within the plate grooves as shown in FIGURE 7.

The orientation tool 43 is necessary in order to provide groove-to-ridge stacking (full nesting) of the plates as they are deposited upon the plate supports 15 on the conveyor 1. Initially, the supply plates are stacked with the partitions in alignment, as near as possible, with the three prongs of the centering tool 43. As seen by the dotted lines in FIGURE 7, however, the grooves of the supply plates may later become slightly out of alignment with the prongs of the centering tool 43. The grooves are brought into proper alignment by the centering tool 43 as it enters the grooves on its upward stroke. The prongs will strike a portion of the surface of the groove and as it is raised to its topmost position, it will force the plate to rotate slightly by virtue of the pressure of the prongs against the groove surface whereby the prongs will be centrally seated with the grooves at the very topmost position of the centering device and thus, the plate properly orientated.

The top of the cycle of the centering prongs includes a slight upward movement to literally push the entire supply stack of plates upwardly from the flared ends 21 of the plate retaining bars 17. This frees the lowermost plates from their wedge contacts with the flared ends 21 whereby the plates can be more easily rotated and permits full entry of the centering prongs into the plate grooves. At this point suction cups 26 first contact the bottom of the plate and grip the same.

FIGURE 3 shows the suction cups 26 and the centering tool 43 at the top of their cycle while FIGURES 4-6 show the centering tool and the suction cups at the bottom of their cycle. With further reference to FIGURE 7, it will be noted that suction cups 26 are arranged close together and contact the same divisional area of a plate bottom. This arrangement has been found to facilitate the slight plate distortion which is necessary to permit the plate to pass by flared ends 21 of support bars 17 on removing a plate from the bottom of the supply stack.

As the suction cups 26 with a plate 16 gripped thereby are lowered from the supply stack 16, they pass between a pair of intercepting arms 45 which contact the periphery of the plates as the plates move downwardly. The arms 45 include inwardly extending arc-shaped fingers 47 which contact the plate periphery. These fingers 47, on vacuum release, prevent the plate from descending further, and thus the plate becomes separated from the suction cups 26 and are temporarily held in horizontal position by the fingers 47. FIGURES 3 and 4 show this operation.

At certain timed periods in cooperation with the intermittent advance of the conveyor and the vertical reciprocation of the suction tubes as will be hereinafter explained, the arms 45 are extended in a horizontal plane until they overlie the plate supports 15 of the conveyor 1. This is shown more clearly in FIGURES 5 and 6. The arms 45 are then rotated 90 degrees downwardly to remove the support of the plates given by fingers 47 whereby the plate drops on to the plate support 15 of the endless chain conveyor 1.

To accomplish this forward extension and backward movement of the arms 45, the arms are supported in a carriage 49 which operates in tracks 51 (see FIGURE 5). A pair of arms is provided under each supply stack of plates. A rocker arm 53 is connected to the rear end of the carriage 49 and pivoted at point 55. In turn, the rocker arm 53 is pivotally connected with a sweep arm 57 which is in turn connected with a rotatable assembly 58 through pin 59. As the rotatable assembly 58 is moved clockwise by chain 60 which is in turn driven by common drive shaft 39, the carriage 49 along with the arms 45 and the fingers 47 are all first moved forward via the action of rocker arm 53 to advance the plate 16 over the plate support 15. As this rotation continues, the carriage 49 moves backward in its track 51 to return the arms 45 and fingers 47 to their plate receiving position.

Rotation of the arms and fingers ninety degrees in a downward direction to release the plates 16, as shown best in FIGURE 2, is accomplished by top rack 65 and bottom rack 67 which are jointed together by members 69. Each arm 45 of a pair of arms must be rotated in opposite directions to one another whereby the arms 45 and fingers 47 of the pair will simultaneously drop 90 degrees to release the plates. As seen in FIGURE 2, the left hand arms 45 operate by pinions 71 against the top racks 65 while the right hand arms of the pair operate through pinion 73 against the bottom racks 67. A lever 75, operated by hand or automatically in timed manner is secured to the top rack 65. The lever 75 is operated to both release the plate from the fingers 47 and to return the fingers 47 to their plate receiving position. To prevent rotation of the arms 45 during their forward and backward movement, the arms 45 are slidable within the pinions 71 and 73 and are also keyed to the pinions.

As seen in FIGURES 1 and 2, the final stack of plates slides down member 77 on to conveyor belt 79 from which they are subsequently discharged into a suitable collecting unit, not shown.

For timing the various mechanical motions described above, the chain conveyor 1 is driven intermittently through clutch assembly 9 which is engaged and disengaged by an automatically timed mechanism. The clutch 9 which controls the intermittent advance of the conveyor chain is disengaged through a suitable connection between the clutch 9 and a micro switch 90 (FIGURES 1 and 2) supported adjacent the conveyor chain 1, which is actuated through contact with one of the advancing plate receiving supports 15 to disengage the clutch 9 and interrupt the conveyor advance while the plates are deposited thereon. The switch cut-off is automatically timed so that the clutch becomes engaged after a predetermined time whereby the conveyor advance is resumed to advance the plate receivers to the next plate receiving station.

The operation of the crank shafts 37 which are continuously reciprocated by drive 41 through shaft 39 to raise and lower the suction tubes and the orientation tool 43 are timed in accordance with the intermittent movement of the conveyor 1.

As seen in FIGURE 5 as well as FIGURE 2, the forward and backward movement of the arms 45 and fingers 47 are also accomplished through drive shaft 39. The forward and backward movement of the arms 45 occurs also while the conveyor chain 1 is advancing. When the clutch 9 is disengaged, the advance of the conveyor chain is interrupted and at this time the lever 75 is operated to rotate the arms 45 and release the plates 23 therefrom to drop them upon the plate supports 15.

Manually operated switches 92 and 93 operate respectively the main drive motor 41 and the clutch disengaging mechanism for clutch 9 when manual operation is desired.

It will be apparent to those skilled in the art that chain conveyor 1 may be continuously advanced in carefully timed relation with the rotation of arms 45 which releases plates 16 to thereby drop them upon the plate supports 15. Such timing merely requires that plate supports 15 be directly under the plates at the moment the released plates contact their respective plate supports 15. In such an arrangement, clutch 9 would be continuously engaged.

With the above described apparatus and method, properly oriented nested packages of partitioned plates can be assembled. Each assembled package can contain, if desired, plates of different colors.

While particular embodiments of the present invention have been illustrated and described herein, it is not intended to limit the invention to such disclosure. Changes and modifications may be incorporated and embodied within the scope of the following claims.

What is claimed is:

1. Apparatus for assembling a predetermined number of partitioned plates in a fully nested stack, said plates having partition ridges and complementary grooves on the respective top and bottom surfaces thereof, said apparatus comprising means for supporting a supply stack of plates, discharge means in said supporting means through which a plate in the supply stack may be withdrawn to a position removed from the supporting means, plate gripping means supported adjacent said discharge means for gripping and removing a plate of said supply stack through said discharge means to the position removed from the plate supporting means, plate orienting means operatively associated with said plate gripping means, said orienting means being arranged to enter into the partition grooves on the bottom of a plate in the supply stack and orient the plate in a predetermined manner before it is removed from the supply stack, means cooperating with the plate gripping means and the orienting means for receiving the plate at the position removed from the supporting means while maintaining its predetermined orientation, and an assembly station arranged for receiving each plate from the plate receiving means in its predetermined oriented position.

2. Apparatus according to claim 1 wherein the plate receiving means comprises a pair of arms between which the plate gripping means operates and means for positioning the arms above the assembly station.

3. Apparatus according to claim 2 wherein the assembly station is located below and to one side of the supply stack of plates.

4. Apparatus according to claim 3 wherein the arms include means supporting the plate periphery in a horizontal plane while maintaining the plate in its predetermined oriented position.

5. Apparatus according to claim 4 including means for moving said arms outwardly from under the periphery of said plate without disturbing the predetermined orientation of said plate and thereby dropping said oriented plate downwardly onto said assembly station when in a position above the same.

6. Apparatus according to claim 5 wherein said assembly station comprises a skeleton framework, the elements thereof having a spatial relationship with one another which coincides with the spatial relationship of partition grooves on the plate bottom.

7. Apparatus according to claim 1 wherein the plate orienting means comprises a skeleton framework, the elements thereof having a spatial relationship with one another which coincides with the spatial relationship of partition grooves on the plate bottom.

8. Apparatus according to claim 1 wherein the plate gripping means comprises suction means arranged for gripping the bottom of a plate after predetermined orientation by said orienting means.

9. A process for assembling a fully nested stack of a predetermined number of partitioned plates having partition ridges and complementary grooves on the respective top and bottom surfaces thereof, said process comprising the steps of providing a supply stack of plates over an opening through which the lowermost plate may be withdrawn, orienting the lowermost plate of said supply stack to a predetermined position, gripping said oriented plate and withdrawing it through said opening to a position below the same while maintaining its established orientation, moving the withdrawn plate while maintaining its established orientation from its position under the opening to a point above an assembly station, then dropping said oriented plate onto said assembly station without imparting rotation thereto and repeating the above steps whereby an assembled and fully nested stack of plates is formed.

10. A process according to claim 9 wherein the orienting step includes slightly raising the plate supply stack above its normal rest position to thereby facilitate orientation of the plate.

References Cited in the file of this patent
UNITED STATES PATENTS

| | | |
|---|---|---|
| 1,522,717 | Frost | Jan. 13, 1925 |
| 1,658,837 | Derby | Feb. 14, 1928 |
| 2,653,743 | Stenger | Sept. 29, 1953 |
| 2,704,593 | Galloway | Mar. 22, 1955 |